(12) United States Patent
Schmitt-Lewen

(10) Patent No.: US 11,548,300 B2
(45) Date of Patent: Jan. 10, 2023

(54) METHOD FOR OPERATING A PRINTING MACHINE WITH A PROCESSOR

(71) Applicant: HEIDELBERGER DRUCKMASCHINEN AG, Heidelberg (DE)

(72) Inventor: Martin Schmitt-Lewen, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 178 days.

(21) Appl. No.: 16/871,350

(22) Filed: May 11, 2020

(65) Prior Publication Data

US 2020/0353761 A1 Nov. 12, 2020

(30) Foreign Application Priority Data

May 10, 2019 (DE) .............................. 102019206787

(51) Int. Cl.
*B41J 29/38* (2006.01)
*B41J 13/00* (2006.01)
*G03G 15/00* (2006.01)

(52) U.S. Cl.
CPC ...... *B41J 13/0009* (2013.01); *G03G 15/5062* (2013.01)

(58) Field of Classification Search
CPC ............. B41J 13/0009; G03G 15/5062; G03G 15/6508
See application file for complete search history.

(56) References Cited

U.S. PATENT DOCUMENTS

| | | | |
|---|---|---|---|
| 6,411,314 B1 | 6/2002 | Hansen et al. | |
| 8,630,486 B2 | 1/2014 | Fuchsenthaler | |
| 8,654,357 B2 | 2/2014 | Harano | |
| 9,019,522 B2 | 4/2015 | Shibata | |
| 9,436,898 B2 | 9/2016 | Watanabe et al. | |
| 2010/0149594 A1* | 6/2010 | Pawlik ............... | G03G 15/6508 358/1.16 |
| 2019/0202197 A1 | 7/2019 | Singer et al. | |

FOREIGN PATENT DOCUMENTS

| | | |
|---|---|---|
| CN | 102087588 A | 6/2011 |
| CN | 102673173 A | 9/2012 |
| CN | 102848746 A | 1/2013 |
| CN | 10409739 A | 10/2014 |

(Continued)

*Primary Examiner* — Lam S Nguyen
(74) *Attorney, Agent, or Firm* — Laurence A. Greenberg; Werner H. Stemer; Ralph E. Locher

(57) ABSTRACT

A method for operating a printing machine having a processor and a device for detecting features of printing substrates includes storing print jobs with the printing substrates appropriate thereto in a database. Features of at least one printing substrate are detected by using the device. The detected features of the at least one printing substrate are compared by the processor with the printing substrates of the print jobs from the database. The processor selects at least one print job in which the printing substrates of the print jobs from the database correspond to the at least one detected printing substrate or attain a predefined similarity. The at least one print job selected by the processor is subsequently executed on the printing machine.

12 Claims, 1 Drawing Sheet

(56) References Cited

FOREIGN PATENT DOCUMENTS

| | | |
|---|---|---|
| DE | 10122497 A1 | 11/2001 |
| DE | 102010051952 A1 | 6/2011 |
| DE | 102012100538 A1 | 7/2012 |
| DE | 102012217364 A1 | 3/2014 |
| JP | 2009026203 A | 2/2009 |
| JP | 2017065206 A | 4/2017 |
| WO | 2018178291 A1 | 10/2018 |

\* cited by examiner

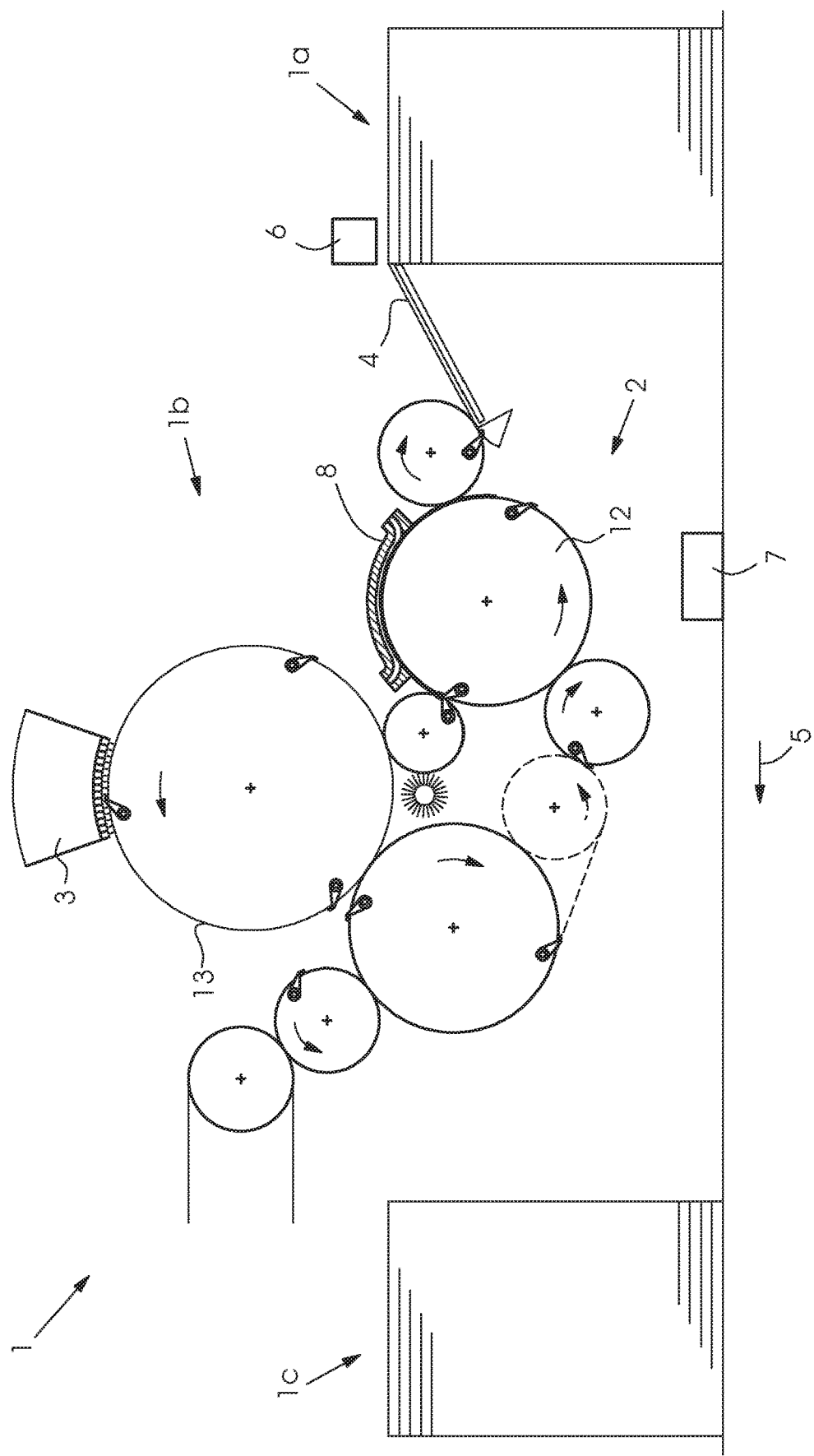

METHOD FOR OPERATING A PRINTING MACHINE WITH A PROCESSOR

CROSS-REFERENCE TO RELATED APPLICATION

This application claims the priority, under 35 U.S.C. § 119, of German Patent Application DE 10 2019 206 787, filed May 10, 2019; the prior application is herewith incorporated by reference in its entirety.

BACKGROUND OF THE INVENTION

Field of the Invention

The present invention relates to a method for operating a printing machine having a processor and a device for detecting features of printing substrates.

Published German Patent Application DE 10 2012 100 538 A1 has disclosed a method for creating documents with an authentication unit. In that method, by using a data system, information items relating to an item of paper to be printed on and data relating to the authenticity of the information items are accessed from a database and, by using a device composed of a printer unit and a read/write unit for a transponder, are printed onto the paper and written to the transponder. In that case, the information items relating to the item of paper to be printed on are printed onto the paper by using the printer unit and are written to the transponder, together with the accessed data relating to authenticity, by using the read/write unit for the transponder.

SUMMARY OF THE INVENTION

It is accordingly an object of the invention to provide a method for operating a printing machine having a processor and a device for detecting features of printing substrates, which overcomes the hereinafore-mentioned disadvantages of the heretofore-known methods of this general type and which permits control of printing processes in printing machines which are initiated on the basis of the printing substrate.

With the foregoing and other objects in view there is provided, in accordance with the invention, a method for operating a printing machine having a processor and a device for detecting features of printing substrates, in which print jobs are stored, with the printing substrates appropriate thereto, in a database, which may for example be present in the processor of the printing machine. Furthermore, features of at least one printing substrate are detected by using the device for detecting features of printing substrates, and the detected features of the at least one printing substrate are compared in the processor with the printing substrates of the print jobs from the database. Then, the processor selects at least one print job in which the printing substrates of the print jobs from the database correspond to the at least one detected printing substrate or at least exceed a predefined similarity threshold. Subsequently, the at least one print job selected by the processor is executed on the printing machine.

In this way, it is possible to control the printing process in a printing machine in a manner dependent on the printing substrates used in the printing machine. This means that, after the detection of the printing substrates used in the printing machine, the print jobs appropriate to the printing substrates are automatically searched for in the database and are then executed. This avoids a frequent change of printing substrates, which is necessary in the classic mode of production of a printing machine, if print jobs which require different printing substrates are executed in succession. In the approach according to the invention, it is conversely the case, by contrast, that the print jobs appropriate to the printing substrate being used are searched for and are for example executed until such time as no further print jobs appropriate to the printing substrate are present. In this case, the detection of the printing substrates used in the printing machine may be performed by using a reader device in the printing machine itself, or the type of printing substrates may be known to the processor of the printing machine in some other way, for example by virtue of the operator of the printing machine inputting the data relating to the printing substrates being used. Through the use of a reader device in the printing machine, the detection of the printing substrates can be automated, because then, in the event of a change of printing substrate, for example at the feeder of the printing machine, the presently used printing substrates can be automatically detected at all times.

In a first refinement of the invention, provision is made to ensure that the predefined similarity between the printing substrates of the print jobs from the database and the at least one detected printing substrate includes a tolerance threshold in percent, for example with regard to the grammage of the printing substrate. Through the provision of a tolerance threshold, it is possible for print jobs from the database with slightly deviating printing substrates to also be executed, as long as those deviations do not exceed a stored tolerance threshold in percent. For example, each printing substrate has a different grammage, and a specification may be stored to the effect that, for example in the case of a tolerance threshold for example of at most 5%, printing substrates with a deviation of ±5% with regard to the grammage are admissible in the print jobs stored in the database. The same may also be stored for other characteristics for printing substrates, in such a way that a dedicated tolerance threshold may be defined for each printing substrate characteristic. As long as the printing substrates of the print jobs in the database lie within the tolerance threshold, the associated print jobs can be executed with the printing substrates used in the printing machine. By contrast, print jobs with printing substrates outside these admissible tolerance thresholds are not executed. Thus, on one hand, the method for operating a printing machine offers a certain tolerance in the execution of the print jobs and, on the other hand, by using the tolerance threshold, ensures that the printing quality attains a predefined minimum level.

In a further refinement of the invention, provision is made for the reader device to detect an identifier applied to the printing substrate before the printing substrate is transported into processing mechanisms of the printing machine. The identifier includes the characteristics of the printing substrate and is already detected by the reader device before the printing substrate is transported into the first processing mechanism of the printing machine, for example the first printing mechanism, in such a way that the print job appropriate thereto can be selected in good time before a printing process. Preferably, for this purpose, the reader device is disposed between the first processing mechanism of the printing machine and a feeder of the printing machine. Printing substrates in sheet form are fed to printing machines by using a feeder which separates the printing substrates in sheet form and then feeds them by using a transport device to the first processing mechanism of the printing machine. By virtue of the reader device being disposed between the first processing mechanism and the feeder of the printing machine, it is ensured that the printing substrates are correctly detected before being transported into the first processing mechanism.

In addition to or instead of the detection of an identifier on the printing substrate, it is also possible to detect the entire printing substrate or at least parts of the printing substrate and infer the characteristics of the printing substrate from the detected characteristics of the printing substrate, for example the surface texture. It is furthermore also possible for an identifier which includes at least one alphanumeric code, or a barcode, or a QR code, or an electronic data chip such as for example NFC, RFID, to be provided on the printing substrate. The characteristics of the printing substrates are then included in these identifiers configured in this way, and can be automatically detected by the reader device.

In a particularly advantageous refinement of the present invention, provision is made for the identifier on the printing substrate to include not only features of the printing substrate but also information items relating to the printed image or relating to the conditioning of the printing substrate. In this way, not only are characteristics of the printing substrate detected by the reader device, but it is also possible at the same time for printed image data to be read out, which data are then printed in a manner controlled by the processor of the printing machine. Furthermore, information items relating to the conditioning of the printing substrate, for example in an inkjet printing process, may be included in the identifier, in order to be able to control the conditioning by using the type and quantity of the conditioning liquid. This is advantageous in particular in the case of digital printing processes being used, where every printing substrate can be provided with a different printed image. Therefore, the present invention is suitable in particular in the case of digital printing processes being used, such as for example inkjet, electrophotography or thermal transfer. With these methods, a different printed image can be applied to each printing substrate in the printing machine.

The method according to the invention may be used when planar printing substrates are used, in classic sheet or web printing machines, although it may also be used in printing processes which print onto non-planar surfaces such as, for example, convexly or concavely curved surfaces. These may involve special printing machines which, for example by using robot arms, print onto curved surfaces of products such as footballs. Soccer balls or automobile doors. In this case, too, it is advantageous if the article which is printed onto, such as for example the football, soccer ball or automobile door, triggers the corresponding printing process and selects the printed image appropriate thereto.

Other features which are considered as characteristic for the invention are set forth in the appended claims.

Although the invention is illustrated and described herein as embodied in a method for operating a printing machine with a processor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE is a diagrammatic, longitudinal-sectional view of an inkjet printing machine with a feeder, a delivery unit and a reader device which is disposed in the region of the feeder and which serves for detecting printing substrates used in the printing machine.

DETAILED DESCRIPTION OF THE INVENTION

Referring now in detail to the single FIGURE of the drawing, there is seen a printing machine 1 according to the invention with a printing substrate feeder 1a, a printing mechanism 1b, and a printing substrate delivery unit 1c. A sheet transport path 2, which is provided between the feeder 1a and the delivery unit 1c, leads past an inkjet print head 3 of the printing mechanism 1b of the printing machine 1. The inkjet print head 3 is disposed at a jetting cylinder 13. A printing substrate 4, in particular a paper, film or cardboard sheet or a web, is guided from the feeder 1a along the transport path 2 to the print head 3, and from there in turn along the transport path 2 to the delivery unit 1c. The direction in which the printing substrate 4 is guided is illustrated in simplified form in the FIGURE by an arrow 5. It is, however, clear to a person skilled in the art that, in the illustrated printing machine 1, the printing substrate 4 is guided through the printing machine not in a straight manner but rather along a meandering path.

The print head 3 has nozzles which discharge ink when activated in accordance with an image, and the desired printed image is thereby generated on the printing substrate 4. At this juncture, it is also pointed out that the print head 3 need not be a single print head, but rather may also involve multiple print heads. It is preferable for at least four print heads for the colors CMYK to be provided. Each individual print head 3 may in this case be constructed as a beam which extends over the width of the printing mechanism 1b and which is in turn made up of multiple printing modules.

The printing of the printing substrate 4 with the ink drops is performed in a first region. A second region is illustrated in the FIGURE as being spaced apart from the first region. The second region is assigned to a conditioning device 8 disposed at a transport cylinder 12. Before the printing on the printing substrate 4, the conditioning device applies a so-called precoat, that is a liquid which permits immediate positionally accurate fixing of an ink drop from the print head 3 on the printing substrate 4.

The conditioning device 8 may also be disposed at other positions in the printing mechanism 1b rather than at the location illustrated. It is crucial that the printing substrate 4 is conditioned before it passes into the region of action of the print head 3. A further alternative is represented by a configuration in which the conditioning device 8 is assigned not to the transport cylinder 12 but to the jetting cylinder 13, and is situated so as to be spaced apart in the direction of the arrow 5 upstream of the print head 3. The printing machine 1 furthermore has a processor 7 and a reader device 6, which are electronically connected to one another. The reader device 6 is disposed between the feeder 1a and the transport cylinder 12 and detects the printing substrates 4 which are transported into the printing machine 1.

After the printing substrates 4 have been identified by the reader device 6, the processor 7 searches in a database connected to the processor 7 for the print jobs appropriate to the detected printing substrates 4. These print jobs are then automatically executed by the inkjet printing machine 1 until such time as the reader device 6 detects a different printing substrate 4. As soon as the printing substrate 4 in the feeder 1a changes, the reader device 6 detects this change, and the processor 7 begins to search through the database again for appropriate print jobs. In this way, the inkjet printing machine 1 always searches in the database for the appropriate print jobs in a manner dependent on the data detected by the reader device 6. The conditioning device 8 may optionally also be implemented as a digital machine which, as an inkjet system, conditions the printing substrate 4 with differently selectable conditioning quantities or conditioning fluids in a manner dependent on the printing substrate. In this way, after the detection of the printing substrate 4 by the reader device 6, it is possible for not only the appropriate print job but also conditioning adapted to the printing substrate 4 to be automatically selected. In the case of a conventional conditioning device 8, a different fluid quantity of the precoat can be selected in a manner dependent on the identified printing substrate 4, for example through selection of a different anilox roller by using an anilox roller revolver in a conditioning device 8 formed as a flexographic printing mechanism.

In addition to the printing substrates 4 in sheet form shown in the figure, such as for example paper, cardboard, film, metal sheets and corrugated cardboard, it is also possible for textiles, ceramic, wood and glass to be printed on, and it is also possible for printing to be performed on web substrates. It is likewise possible for uneven, flexurally rigid objects, and planar, flexurally non-rigid objects on corresponding rigid carriers, to be printed on. It is additionally possible for curved physical objects, such as for example footballs, soccer balls or automobile doors, to be printed on, on inkjet printing machines equipped with corresponding robot arms. The identifiers detected by the reader device 6 may be composed of an alphanumeric code, a barcode, a multidimensional code such as for example a QR code, a data matrix code or an electronic data chip, such as for example NFC, RFID. The use of a magnetic code is also possible. The printing substrates 4 with the identifier may in particular be pre-produced tickets with RFID chip or QR code, NFC/RFID blank cards or pre-printed QR code forms, cardboard packagings equipped with NFC/RFID chips, or documents bearing such a chip. It is also possible for packagings to be detected that have already been pre-processed in an analog printing process, in which the identifier then permits the assignment of the subsequent digital printing without the need to pre-sort the printing substrates 4. This is because the reader device 6 identifies the packagings equipped with the identifier, and the processor 7 then searches in the database for the appropriate print job. It is likewise possible for shipping boxes for Internet trading to be printed with RFID labels which communicate to the inkjet printing machine 1 who the customer is and what individual image and address information is to be printed on the box.

In the case of 3D objects being printed on, what the object is can be identified by using the identifier. The printed image can then also be individually adapted in terms of printing technology in accordance with the feature data by virtue of the object-specific dimensions being taken into consideration and then being able to correspondingly control the inkjet printing machine 1.

LIST OF REFERENCE DESIGNATIONS

1 Inkjet printing machine
1*a* Feeder
1*b* Printing mechanism
1*c* Delivery unit
2 Sheet transport path
3 Inkjet print head
4 Printing substrate
5 Sheet transport direction
6 Reader device
7 Processor
8 Conditioning device
12 Transport cylinder
13 Jetting cylinder

The invention claimed is:

1. A method for operating a printing machine, the method comprising the following steps:
    storing print jobs along with printing substrates appropriate to the print jobs in a database;
    using a device for detecting features of printing substrates to detect features of at least one printing substrate;
    using a processor to compare the detected features of the at least one printing substrate with the printing substrates of the print jobs from the database;
    using the processor to select at least one print job in which the printing substrates of the print jobs from the database correspond to the at least one detected printing substrate or attain a predefined similarity; and
    subsequently executing the at least one print job selected by the processor on the printing machine.

2. The method according to claim 1, which further comprises including a tolerance threshold in percent in the predefined similarity between the printing substrates of the print jobs from the database and the at least one detected printing substrate.

3. The method according to claim 2, which further comprises defining the tolerance threshold with regard to a grammage of the printing substrate.

4. The method according to claim 1, which further comprises using a reader device as the device for detecting features of the printing substrates.

5. The method according to claim 4, which further comprises using the reader device to detect an identifier applied to the printing substrate before the printing substrate is transported into processing mechanisms of the printing machine.

6. The method according to claim 5, which further comprises placing the reader device between the processing mechanism of the printing machine and a feeder of the printing machine.

7. The method according to claim 5, which further comprises selecting the identifier on the printing substrate as at least one alphanumeric code, or a barcode, or a QR code, or an electronic data chip or an NFC or RFID chip.

8. The method according to claim 5, which further comprises providing the identifier on the printing substrate with features of the printing substrate as well as information items relating to a printed image or relating to conditioning of the printing substrate.

9. The method according to claim 4, which further comprises using the reader device to detect an identifier applied to the printing substrate before the printing substrate is transported into a furthermost upstream processing mechanism of the printing machine.

10. The method according to claim 1, which further comprises applying a printed image in the printing machine in accordance with a digital printing process or inkjet printing, or electrophotography, or thermal transfer.

11. The method according to claim 1, which further comprises printing on printing substrates having a planar shape.

12. The method according to claim 1, which further comprises printing on printing substrates having a non-planar surface.

\* \* \* \* \*